United States Patent [19]

Brown

[11] Patent Number: 4,745,038
[45] Date of Patent: * May 17, 1988

[54] INTEGRATED GASIFICATION IRON-AIR ELECTRICAL SYSTEM

[75] Inventor: Jack T. Brown, Churchill, Pa.

[73] Assignee: Westinghouse Electric Corp., Pittsburgh, Pa.

[*] Notice: The portion of the term of this patent subsequent to Oct. 2, 2001 has been disclaimed.

[21] Appl. No.: 550,657

[22] Filed: Nov. 10, 1983

[51] Int. Cl.$^4$ .............. H01M 4/00; H01M 8/04
[52] U.S. Cl. .................... 429/27; 429/17; 429/19; 429/49; 429/221; 75/34
[58] Field of Search ............ 429/17, 19, 27, 221, 429/49; 75/34

[56] References Cited

U.S. PATENT DOCUMENTS

| 2,581,651 | 1/1952 | Gorin | 136/84 |
| 3,338,704 | 8/1967 | Laurent | 75/34 X |
| 3,804,606 | 4/1974 | Archer | 48/206 |
| 3,849,198 | 11/1974 | Seidel | 136/25 |
| 4,132,547 | 1/1979 | Buzzelli et al. | 429/221 X |
| 4,152,489 | 5/1979 | Chottiner | 429/27 |
| 4,236,927 | 12/1980 | Buhl et al. | 429/221 X |
| 4,322,243 | 3/1982 | Frewer et al. | 75/34 |
| 4,448,858 | 5/1984 | Graf et al. | 429/27 X |
| 4,474,862 | 10/1984 | Buzzelli et al. | 429/17 |

OTHER PUBLICATIONS

Cooper et al, Conference, Proceedings of the 13th Intersociety Energy Conversion Engineering Conference, San Diego, CA, pp. 738–744, "Mechanically Rechargeable, Metal-Air Batteries for Automotive Propulsion", Aug. 25–28, 1978.

Primary Examiner—Brian E. Hearn
Assistant Examiner—S. J. Kalafut
Attorney, Agent, or Firm—Daniel P. Cillo

[57] ABSTRACT

An integrated gasification iron-air electrical system, capable of generating electrical energy from a carbon containing material, is made, the system containing a gasification furnace having at least one gasification reactor zone where a carbonaceous material contacts and reacts with a gas containing steam, to produce a hot gas reaction product containing CO and $H_2$; where the hot gas then contacts discharged iron electrodes at over 450° C., to convert discharged iron compounds to iron compounds, and the recharged iron electrodes are then placed in iron-air cells which generate electrical energy.

9 Claims, 2 Drawing Sheets

INTEGRATED GASIFICATION IRON-AIR ELECTRICAL SYSTEM

BACKGROUND OF THE INVENTION

Iron-air batteries are well known in the art, and taught, for example, by Chottiner, in U.S. Pat. No. 4,152,489. These batteries can utilize air as an oxidant reactant. The air contacts an electrode made of an outer hydrophobic membrane, laminated to an active hydrophilic layer. The electrode layers can contain carbon particles, catalyst, low oxygen overvoltage material, such as WC, and binder, pasted into a fiber metal plaque. These batteries usually contain an iron fuel electrode, immersed in potassium hydroxide electrolyte, and disposed between a set of air electrodes.

The iron electrode can contain a mixture of iron oxides, for example $Fe_2O_3$ and $Fe_3O_4$, with reaction promoting compounds and dispersing agents, pasted into diffusion bonded, nickel-plated steel plaques, as taught by Seidel, in U.S. Pat. No. 3,849,198. The iron electrode can also be self-supporting, and contain sintered metallic iron particles coated with a metal sulfate, such as $MgSO_4$, as taught by Buzzelli et al. in U.S. Pat. No. 4,132,547. Because they operate at about 25° C. and have a very high energy-to-density ratio, they have been considered in the past as a power source for electrically run automobiles.

Fuel cells of the phosphoric acid, molten carbonate, and solid oxide type are also well known power sources, although they operate at a much higher temperature than an iron-air battery, usually, from about 150° C. to 1100° C. Coal gasification processes are also well-known means to produce electrical energy, as taught, for example, by Archer et al., in U.S. Pat. No. 3,804,606. Fuel cells have been suggested to be used to provide heat to a wide variety of systems, including large fluidized bed coal gasification reactors, where coal char is fed into the reactor, along with air or oxygen and steam, and heat is generated along with valuable combustible gases, such as CO and hydrogen, as taught by Gorin, in U.S. Pat. No. 2,581,651.

In Gorin, the coal gasification reactor heat of combustion is kept at about 760° C., which is below maximum operating temperature, so as to be at a temperature less than the operating range of the fuel cell which receives part of the combustion heat. The fuel cell also generates heat, which helps to maintain the coal combustion. The CO and hydrogen from the gasification furnace, along with air or oxygen are used as reactants for the fuel cell. Such a process, however, loses some efficiency because there are many highly technical problems associated with maintaining a fuel cell within a gasification reactor. What is needed is an even more efficient, and simpler method of converting coal to electrical energy.

SUMMARY OF THE INVENTION

The above needs can be met, and the above problems solved, by combining a battery of iron-air cells with a coal gasification system, to generate electrical energy, where the iron electrodes can be recharged utilizing the reactor gaseous products. It has been found that the iron electrode of an iron-air cell can be recharged not only electrochemically over a 2 to 10 hour period, but also chemically by heating at from about 450° C. to about 800° C. in the presence of a reducing atmosphere, such as dissociated ammonia, and proper mixtures of carbon monoxide and hydrogen. The iron electrode is unique in this dual charging capability.

According to the invention, an electrical power generation system is set up, comprising at least one coal gasification reactor zone and least one iron-air battery, where, in the coal gasification reactor, a carbonaceous material, preferably coal, is reacted with a gaseous medium, containing steam, and preferably air or oxygen, preferably at a temperature above about 850° C., to provide heat and a gaseous reaction product containing carbon monoxide and hydrogen; where, at least part of, and preferably all of the heat and gaseous reaction product contact discharged iron electrodes, at a temperature, preferably over about 450° C., and for a time effective to recharge the iron electrodes; and where the recharged iron electrodes are placed in a battery of iron-air cells which generate electrical energy.

In this integrated system, problems of fuel cell maintenance within a combustion zone are eliminated. Air, water, preferably as steam, and coal are combusted, and preferably all the coal energy, as heat and product gases, is used to recharge and thus operate a multiplicity of electrical energy producing iron-air cells. At off-peak hours, the energy from the coal can be used to inventory recharged iron electrodes, as well as to generate power. During peak hours, the inventoried iron electrodes can be additionally used to generate additional power. This provides a very efficient, flexible, simple, and commercially feasible coal to electric power generation system, which is especially useful in the United States because of the abundant supply of relatively low cost coal.

BRIEF DESCRIPTION OF THE DRAWINGS

For a better understanding of the invention, reference may be made to an embodiment exemplary of the invention, shown in the accompanying drawings, in which.

DESCRIPTION OF THE PREFERRED EMBODIMENTS

Figure 1:
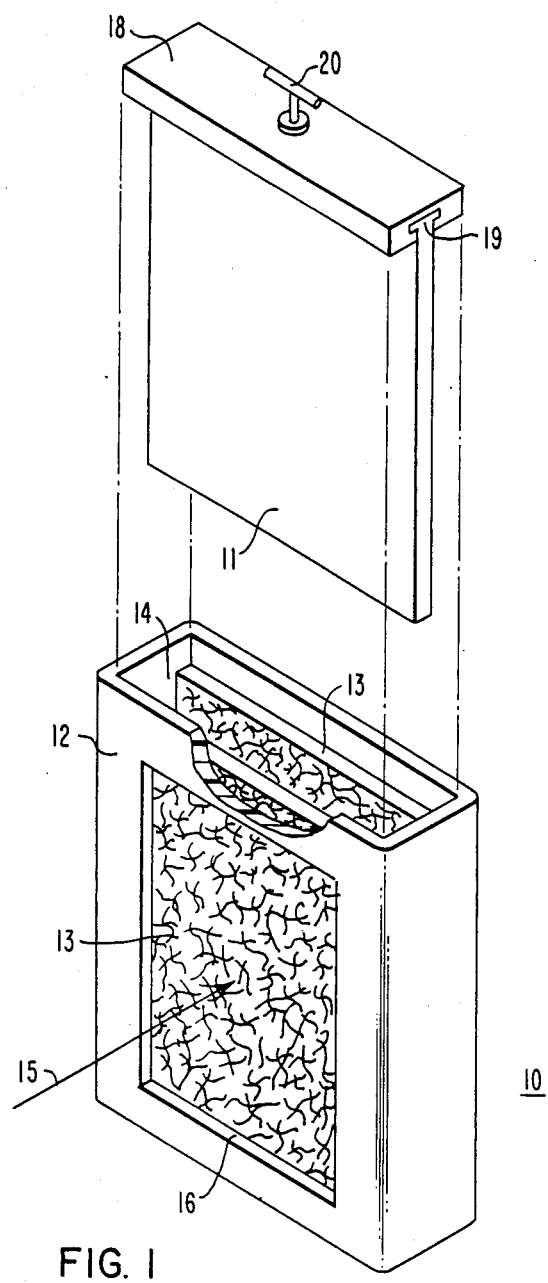
FIG. 1 is an exploded perspective view of one possible type of iron-air cell useful in the integrated energy system of this invention.

Referring now to FIG. 1 of the drawings, the electrical cell 10 is a general representation of one possible type of iron-air cell useful in this invention, including removable iron electrode 11, disposed in electrolyte between two air electrodes, all contained in a casing having air inlet means. Approximate dimensions could be about 3.5 feet (1.1 meters)×3.5 feet×2.5 inches (6.4 cm.) Generally, the cell 10 includes a casing 12 for support and containment of air electrodes 13, shown inside the casing, and open to air on each side of the casing, as well as alkali electrolyte, which is contained in sealed electrolyte wells 14 disposed between each set of air electrodes, as shown.

Preferably, the casing 12, comprising the sides and bottom, is fabricated from ABS plastic or other non-conducting material that is stable or resistant to the electrolyte. The electrolyte is usually an alkali hydroxide, such as KOH or NaOH with a possible optional addition of LiOH. Air or oxygen 15 can be fed to air electrode surfaces through the open casing side 16. The term "air" as used throughout, whether in relation to the cell or the coal gasification furnace, will be meant to include oxygen.

Iron electrodes 11, about 0.25 cm (0.1") thick, are, preferably, removably attached to removable iron electrode support plate member 18, by any suitable means, such as a locked tongue and groove assembly, for example, T-shaped recesses through the support member, as shown, or by bolts or screws. The iron electrode top can have, for example, a high density coined T-shaped or other type top section 19 for insertion into a corresponding groove in the support plate member 18. Support plate member 18, with removably attached iron electrode 11, is lowered into the casing, as shown, with the iron electrode fitting into the electrolyte wells 14, between air electrodes and facing the hydrophilic air electrode layer. A handle to remove the support member is shown as 20. Electrical connections to positive and negative terminals are not shown, but would of course be included. It is to be understood, that FIG. 1 is illustrative and not limiting, either as to the cell or removable iron electrode design.

The air electrode cathodes 13, have a laminar structure, comprising a hydrophilic section and a hydrophobic section, with incorporated current collector. The active material hydrophilic section for this electrode can comprise particles of oxygen absorption/reduction carbonaceous material, such as carbon, graphite and the like; about 10 wt. % to about 50 wt. % binder, such as fluorinated ethylene propylene resin or polytetrafluoroethylene resin; a catalyst such as platinum, gold, silver and the like; and from about 0.25 part to about 5 parts/part carbonaceous material of a lower oxygen overvoltage material, such as $CoWO_4$, $WS_2$, WC, WC fuse coated with 1 wt. % to 20 wt. % Co, and their mixtures. The hydrophilic layer can comprise one or a plurality of plies. The hydrophilic layer is disposed next to the electrolyte.

The hydrophobic layer can comprise fluorinated ethylene propylene and/or polytetrafluoroethylene particles or fibers, mixed with high surface area carbons and optionally mixed with polymethylmethacrylate plasticizer and the like. The hydrophobic layer is disposed next to the air supply. The porous current collector can be made of expanded nickel, coated or uncoated fiber metal, such as diffusion bonded steel wool or nickel coated diffusion bonded steel wool and the like. The hydrophilic layer, which generally contains the current collector, is usually roll laminated to the hydrophobic layer. Complete details on the air electrode can be found in U.S. Pat. No. 4,152,489, herein incorporated by reference.

The iron electrode anodes 11, can comprise iron powder, initially present as FeO, $Fe_2O_3$, $Fe_3O_4$, $FeO \cdot Fe_2O_3$, $Fe_2O_3 \cdot H_2O$ and the like, with additions of sulfur containing additive and optional thickeners and dispersing agents. These oxides are reduced to Fe charged material by hydrogen reduction in the manufacturing process for iron electrodes. These materials can be slurried into a paste, which can be roll pasted into a porous supporting current collector, such as a mesh or grid of fibrous strands, such as steel, nickel or nickel plated iron or steel of from about 75% to 96% porosity. The pasted electrodes are then heated in a furnace with a reducing atmosphere. One suitable grid structure is diffusion bonded nickel or steel fiber wool, where there is an interdiffusion of atoms across contacting fiber interfaces without fiber melting. Such iron powder and electrodes are described in detail in U.S. Pat. No. 3,849,198, herein incorporated by reference.

Another iron electrode anode can be made from a water slurry admixture of elemental iron particles and a soluble metal sulfate, such as $MgSO_4$ or $CdSO_4$. The slurry is dried, broken up and size graded, pressed to provide a green plaque structure, and then thermally reduced, activated and sintered at up to 1000° C. in a reducing atmosphere, preferably hydrogen gas, to provide a fused, self-supporting plaque, that can be used alone or bonded to a current collector for further support. Such electrodes are described in detail in U.S. Pat. No. 4,132,547, herein incorporated by reference. It is to be understood that the above iron electrode descriptions are illustrative and not limiting, and any electrode containing a form of iron as the main active material component can be recharged in the integrated system of this invention.

In the iron-air cell, the iron electrode is the limiting electrode. The iron-air system is unique in that the fuel electrode, the iron electrode, can be electrically recharged over a 2 hour to 10 hour period, or it can be mechanically recharged over a much shorter period by a special heating process. All of the other electrically rechargeable battery systems require electrical communication between the anode and cathode for recharge. Electrochemically, the iron electrode in the fully charged state is essentially metallic iron. Upon discharge, the electrode is partially converted to $Fe(OH)_2$, by the reaction $Fe + 2(OH)^- \rightarrow Fe(OH)_2$. The reaction product $Fe(OH)_2$ can be electrically returned to Fe, by reduction of $Fe(OH)_2$ through heating the discharged iron electrode in a reducing gas at from about 450° C. to about 700° C., preferably from about 550° C. to about 700° C., for an effective time, preferably about 10 minutes to 20 minutes, producing an electrode which is fully charged. Temperatures over about 700° C. could cause sintering and loss of surface area. Temperatures under about 450° C. are not effective to provide good reduction to Fe. Useful reducing atmospheres include mixtures of carbon monoxide and hydrogen. The electrodes are usually very thin, so that minimum cooling is needed after recharge.

Figure 2:
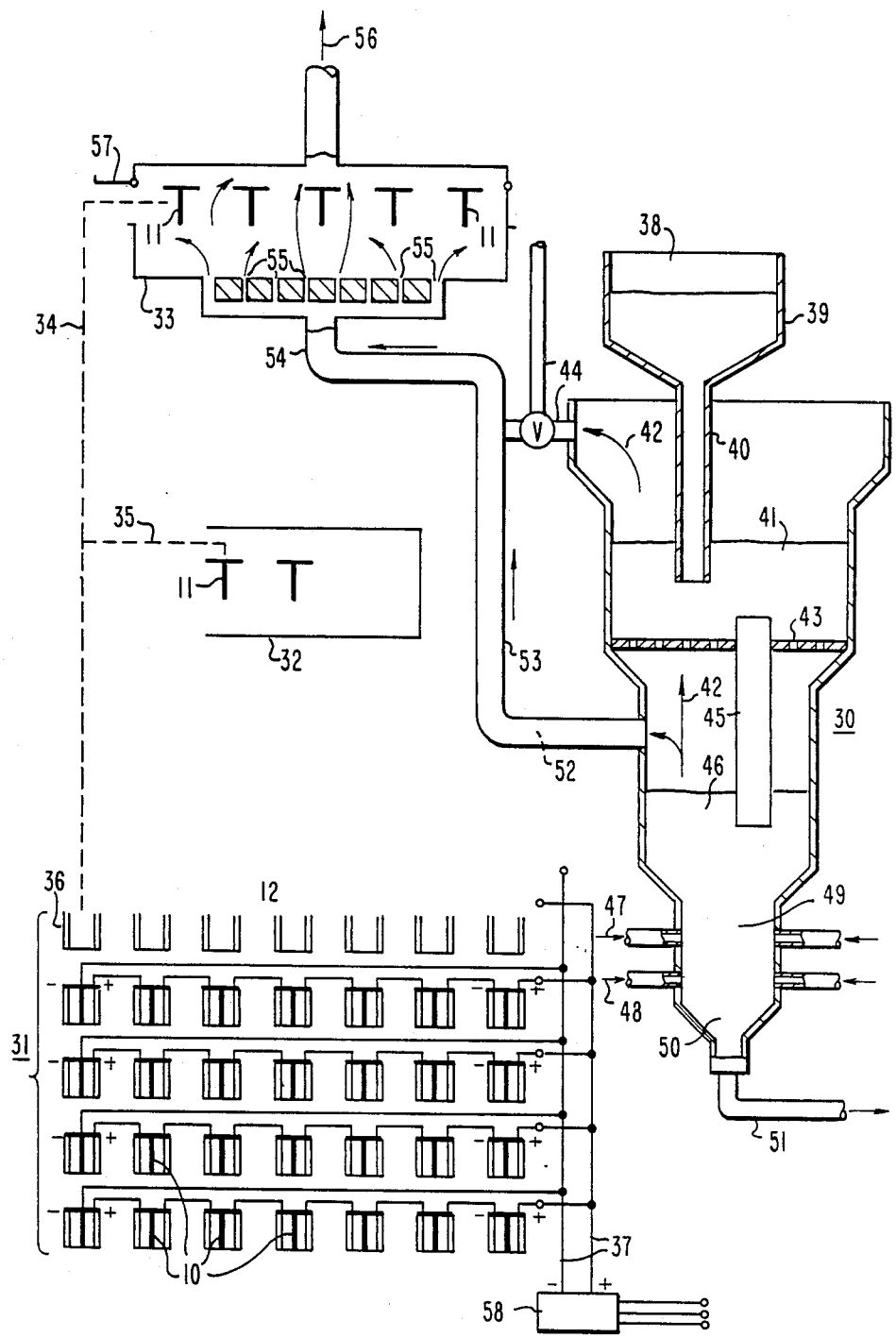
FIG. 2 is a schematic diagram of one type of integrated coal gasification iron-air electrical system for producing electrical energy from coal.

As shown in FIG. 2, the integrated, coal gasification iron-air electrical system of this invention, can comprise a coal gasification furnace 30 and a bank of iron-air cells 31. The positive and negative terminals have been shown for only two sets of cells. One type of useful iron-air cell 10 has been described in detail hereinbefore, comprising a casing 12 and removable iron electrodes 11 disposed in electrolyte between air electrodes. As shown in FIG. 2, a plurality of iron electrodes 11 have been removed from their casings 12, passed to a wash station to remove electrolyte, not shown, and are in the process of being recharged in forced gas oven 33.

At off-load periods, the electrodes from oven 33, after recharge, can be placed in inventory storage 32. At peak-load periods, the electrodes from oven 33, after recharge, can be replaced in their casings 12 via route 34, and the electrodes from inventory storage can be replaced in their casings via route 35. Row or battery 36 of iron-air cells is shown awaiting use, while all the other charged iron-air cells 10 in each row of bank 31 are shown in use, interconnected in series, generating electrical energy $e^-$ through electrical conductors 37, each row of the bank being interconnected in parallel to the other operating rows.

The bank of iron-air cells 31 can contain as many, for example, as 800,000 electrically interconnected cells, generating 300 megawatts of power. For example, each cell, containing about 10 square feet (1.07 square meters) of iron electrode area (3.17 ft.×3.17 ft.), can provide 0.75 volts. In a row of 2000 cells, 1500 volts will be generated, providing 500 amps. For a 300 megawatt power output with 1500 volts; 200,000 amps would be needed, requiring 400 rows of cells in parallel. Each cell would require about 3 inches (7.6 cm.) including air space, or ¼ foot×2000 cells=500 feet per row. Using 4 feet per row×400 rows=1600 feet width, or a total of 800,000 square feet if all the cells were placed in a non-stacked arrangement. Of course, the cells could be easily stacked on supports, with three cells arranged on top of each other, cutting floor space by ⅓.

One type of gasification furnace is shown as 30. Coal, of course, is the least expensive carbon containing starting material. While a fixed bed type, utilizing lump coal, can be used, the system will be described in terms of the preferred fluidized bed type, utilizing finely ground coal powder. The furnace 30 can comprise several vessels of different cross sections, which generally decrease from the top to the bottom of the furnace, to provide the desired gas and particle velocities in the vessels and to provide at least one carbon powder fluidized bed.

A carbonaceous material, comprising a material such as coal powder 38, having a predetermined particle size range, is placed in hopper 39. The coal powder may contain other useful additives, well known in the art, such as lime or dolomite, which can act as a sulfur removing additive. The coal powder flows downwardly through a conduit 40 into a first bed 41, where it can be dried by part of the rising hot product gases 42, flowing upwardly through small apertures in support plate 43. The temperature of gas 42, which passes through the first bed 41 and into valved gas exit 44, can be from about 300° C. to 800° C., when the furnace reaction temperature is in the range of about 850° C. to 1250° C.

The dried coal powder from the bed 41 flows downwardly through a conduit 45 into the main portion of the furnace, providing the main coal gasification reactor bed 46. Calcium sulfide, resulting from reaction of sulfur in the coal and lime additive can settle to the bottom of bed 41, where it may be removed through a separate conduit, not shown. Air 47 and steam 48 are introduced into the reactor bed 46 causing it to become fluidized, form a low-velocity upper portion and a high-velocity bottom portion 49. The bottom portion can operate in a preferred temperature range of from about 850° C. to about 1250° C., to burn and/or gasify all of the carbon in the coal powder, to produce CO and $H_2$ according to the reactions:

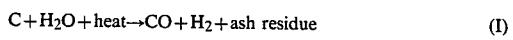

$$C+H_2O+heat \rightarrow CO+H_2+ash\ residue \qquad (I)$$

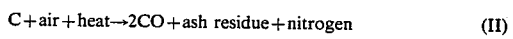

$$C+air+heat \rightarrow 2CO+ash\ residue+nitrogen \qquad (II)$$

The ash residue 50 agglomerates at high temperature, and flows downward through conduit 51, where it is removed from the furnace. The CO and $H_2$ product gases 42 and 52, which will also contain $H_2O$, $N_2$ and $CO_2$, achieve a temperature in the range of from about 800° C. to about 1100° C. as they exit the main reaction bed 46.

The high velocity portion 49 of the reactor provides a high temperature coal gasification zone in which high rates of heat transfer are achieved by utilizing hot gases as well as high internal circulation of solids. Temperature control in this portion is achieved by varying the air/steam ratio and ash removal rates. The ash gives up its heat to the incoming air and steam increasing the efficiency of the system. Such coal gasification furnaces are well known in the art and are described in further detail in U.S. Pats. Nos. 2,581,651 and 3,804,606, herein incorporated by reference.

As shown, a major portion of the product gases, 52 is exhausted through conduit 53, while a minor portion 42 can be used to dry the entering carbon containing powder in the first bed 41. The fine particles which flow with the product gases through gas exit 44 and conduit 53 can be collected by cyclone separators, not shown, and returned to bed 41 or 46. Both product gas streams can combine and mix in conduit 54 in appropriate volumes to provide a stream of CO and $H_2$ gases having a temperature range of from about 450° C. to about 800° C., which is appropriate to iron electrode recharging. If desired, stream 42 can be exhausted rather than fed into conduit 54.

The product gas mixture from conduit 54 is fed into gas oven 33 through a plurality of gas inlets 55, to contact, surround and react with the $Fe(OH)_2$ in the discharged iron electrodes 11 in the oven, at a temperature of from about 450° C. to about 700° C., according to the reactions:

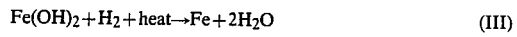

$$Fe(OH)_2+H_2+heat \rightarrow Fe+2H_2O \qquad (III)$$

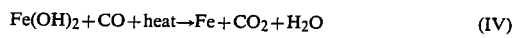

$$Fe(OH)_2+CO+heat \rightarrow Fe+CO_2+H_2O \qquad (IV)$$

Nitrogen or water vapor present in the product gas mixture do not substantially affect the charging reactions. Preferably the product gas mixture will contain an excess, i.e., over 55 volume % of $H_2$, as controlled by using an appropriate air/steam balance. These reactions can be operated so that almost all the product gas heat is utilized in recharging the iron electrodes 11 in the oven, so that stack gases 56, comprising steam and $CO_2$, and nitrogen, exit the integrated system at only about 40° C. to about 75° C. Heat exchanges to effect this and recirculate steam to the gasifiers can certainly be made part of this system.

Furnace door 57 is shown open, but of course would be tightly secured during furnace operation. After the iron electrodes had been contacted by the hot product gases for from about 10 minutes to about 20 minutes, the electrodes would be automatically and rapidly removed from the furnace, for example, by a conveyor belt arrangement or the like, not shown, so that little time or hot product gas would be lost. After complete reduction of the $Fe(OH)_2$ in the discharged iron electrodes 11 in the oven 33 to elemental iron, Fe, the recharged iron electrodes could be sent to a waiting first row 36 of cells, via route 34, or sent to charged electrode inventory 32, via route 34 and 35, as described previously. Also shown, receiving d.c. power through conductors 37, interconnected to the cells, is inverter 58, which can convert the d.c. power to alternating current, to be used for industrial, commercial or residential electricity.

Reactions (III) and (IV), converting $Fe(OH)_2$ to elemental iron, show that one mole of hydrogen or carbon monoxide is needed to reduce 90 grams of ferrous hydroxide, that is about 22.4 liters or 0.791 cubic feet of hydrogen or carbon monoxide. Since both hydrogen and carbon monoxide have a heat content of about 340

BTU per cubic foot, this means about 269 BTU will be used to reduce 90 grams of ferrous hydroxide. This 90 grams of ferrous hydroxide would have yielded 68.6 watt-hours. This leads to a heat rate of 269 Btu/0.0686 kWh which is 3921 Btu/kWh. Of course it would not be possible in a practical system to obtain a heat rate this low. Roughly calculating a possible overall heat rate from energy in the coal feed to alternating current electric power is as follows:

Coal to coal gas: 85%
Coal gas utilization: 90%
System auxiliary power requirements: 5%
Electrochemical system operating voltage: 75% of theoretical
Inverter efficiency: 96%.

$$\text{Overall } \frac{3921}{.85 \times .90 \times .95 \times .75 \times .96} \simeq 7500 \text{ Btu/kWh,}$$

which is still a favorably low heat rate. This is especially true for a system with the potential for flexibility, that is, load following capability, high reliability and availability due to modularity, and suitable due to low environmental impact.

EXAMPLE

A 40 sq. cm. by 0.25 cm. thick iron electrode, containing activated iron oxide powder pasted into a porous, diffusion bonded steel wool current collector plaque was electrically discharged in an iron-air cell. The discharged electrode, containing iron compounds substantially as $Fe(OH)_2$, was removed from the cell, water washed to remove KOH electrolyte, and placed in a furnace containing a mixture of $H_2$, CO and water vapor, operating at 650° C., for 10 minutes. The $H_2$ and CO gases were passed from their respective pressurized containers and mixed together. Then, the mixture was bubbled through water to pick up moisture, thus simulating the gas composition obtainable from a coal gasification reactor. The electrode was cooled and then returned to the iron-air cell environment for electrical discharge. It operated well indicating complete recharge and return to Fe material. Its performance was equivalent or slightly better than the previous discharge, the quick heating causing no adverse effects.

I claim:

1. An integrated, gasification, iron-air electrical system, capable of generating electrical energy from a carbonaceous material, comprising:
   (A) a gasification means for carbonaceous material comprising at least one gasification reactor, where a carbonaceous material is contacted and reacted with a gaseous medium containing steam and air, at a temperature and for a time effective to gasify the carbonaceous material and produce a hot gaseous reaction product comprising CO and $H_2$;
   (B) an iron-air cell containing at least one discharged iron electrode
   (C) means to remove the discharged iron electrode from the cell of (B), and contact it with the gaseous reaction product produced in (A);
   (D) the discharged iron electrode removed from the cell of (B), containing material consisting essentially of Fe and $Fe(OH)_2$, which electrode is contacted with the hot gaseous reaction product produced in the gasification reactor of (A), directly, at a temperature of from about 450° C. to about 700° C., for a time effective to convert, by reduction, discharged iron compounds consisting essentially of Fe and $Fe(OH)_2$ to charge iron compounds in the electrode and provide a recharged iron electrode;
   (E) an iron-air cell into which the recharged iron electrode provided in (D) is placed;
   (F) means to transport the recharged iron electrode provided in (D) to the iron-air cell of (E); and
   (G) electrical connection means attached to the iron-air cell of (E), providing the cell with capability of generating electrical energy.

2. The system of claim 1, where the carbonaceous material is coal, the recharged iron electrode contains elemental iron, the iron electrode comprises active material disposed within a porous fiber metal current collector and the hot gaseous reaction product contacting the electrode contains over 55 volume % of $H_2$.

3. An integrated, coal gasification, iron-air electrical system, capable of generating electrical energy from coal, comprising:
   (A) a coal gasification means comprising at least one coal gasification reactor, where coal is contacted and reacted with a gaseous medium containing steam and air, at a temperature and for a time effective to gasify coal and produce a hot gaseous reaction product comprising CO and $H_2$;
   (B) a plurality of iron-air cells, each containing at least one discharged iron electrode having a fiber metal structure;
   (C) means to remove the discharged iron electrodes from the cells of (B), and contact them with the gaseous reaction product produced in (A);
   (D) the discharged iron electrodes removed from the cells of (B), containing material consisting essentially of Fe and $Fe(OH)_2$, which electrodes are contacted with the hot gaseous reaction product in the gasification reactor of (A), directly at a temperature of from about 450° C. to about 700° C., for a time effective to convert, by reduction, discharged iron compounds consisting essentially of Fe and $Fe(OH)_2$ to charged iron compounds in the electrodes and provide a plurality of recharged iron electrodes;
   (E) a plurality of iron-air cells into which the recharged iron electrodes provided in (D) are placed;
   (F) means to transport the recharged iron electrodes provided in (D) to the iron-air cells of (E); and
   (G) electrical interconnection means attached to the iron-air cells of (E), and to an inverter, providing the cells with capability of generating electrical energy.

4. The system of claim 3, where the discharged iron electrodes contain iron and, iron hydroxide compounds substantially as Fe and $Fe(OH)_2$, and are heated at from about 550° C. to about 700° C.

5. The system of claim 3, where the recharged iron electrode contains elemental iron, and the hot gaseous reaction product contacting the electrodes contain over 55 volume % of $H_2$.

6. The system of claim 3, where the coal gasification means is a fluidized bed coal gasification furnace utilizing a downward flow of coal and an upward flow of gases, operating at a reaction coal gasification temperature of from about 850° C. to about 1250° C.

7. The system of claim 3, where the iron-air cells comprise an iron electrode disposed in alkali electrolyte between two air electrodes, all contained in a casing having air inlet means.

8. The system of claim 7, where the alkali electrolyte is an alkali hydroxide, the iron electrodes are removably attached to a removable support plate, the iron electrode comprises active material disposed within a porous fiber metal current collector, and the air electrode comprises an active material hydrophilic layer containing a current collector disposed next to electrolyte and bonded to a hydrophobic layer.

9. The system of claim 1, where the discharged iron electrodes contain iron, and iron hydroxide compounds substantially as Fe and $Fe(OH)_2$, and are heated at from about 550° C. to about 700° C.

* * * * *